United States Patent [19]

Langland

[11] Patent Number: 4,461,412
[45] Date of Patent: Jul. 24, 1984

[54] CONTAINER AND MANUAL HOLDER

[76] Inventor: Robert Langland, R.R. #1, Bingham Lake, Minn. 56118

[21] Appl. No.: 451,271

[22] Filed: Dec. 20, 1982

[51] Int. Cl.³ .............................................. B60R 7/04
[52] U.S. Cl. .................................. 224/273; 224/42.42; 224/906
[58] Field of Search ................. 224/273, 42.42 R, 906, 224/277, 42.45 R; 206/427; 141/301

[56] References Cited

U.S. PATENT DOCUMENTS

| D. 188,415 | 7/1960 | Scheurer | 224/273 |
|---|---|---|---|
| 2,471,030 | 5/1949 | Foulke | 211/75 |
| 2,640,596 | 6/1953 | Reeder | 211/37 |
| 2,774,168 | 12/1956 | Rous | 206/427 |
| 2,915,082 | 12/1959 | Shaw | 137/353 |
| 3,050,223 | 8/1962 | Scioloro | 224/29 |
| 3,508,732 | 4/1970 | Trachtenberg | 248/226 |
| 3,901,386 | 8/1975 | Hennessey | 206/427 |
| 4,303,109 | 12/1981 | Cohen | 14/301 X |

FOREIGN PATENT DOCUMENTS 1115669 1/1982 Canada ........................... 224/42.42

Primary Examiner—Steven M. Pollard
Assistant Examiner—David Voorhees
Attorney, Agent, or Firm—Merchant, Gould, Smith, Edell, Welter & Schmidt

[57] ABSTRACT

A document and cylindrical receptacle holder apparatus (10) for a tractor or the like. The holder apparatus (10) includes a sheet of material bent to form at the front end of a sidewall (12), a front end support wall (14), substantially parallel to but offset from the sidewall (12). The sidewall (12) is further bent along a bottom portion to form a bottom wall (16) perpendicular to the sidewall (12). The side and bottom walls (12,16) cooperate with a first wall (22) of the vehicle to form an upwardly opening compartment. The sidewall (12) is bent at a back end to form a back end support wall (18). A front end support wall (14) and the back end support wall (18) cooperate to retain the holder apparatus (10) in position. The holder apparatus (10) further includes a cylindrical member (20) suitably attached to the back end support wall (18) and the sidewall (12).

14 Claims, 6 Drawing Figures

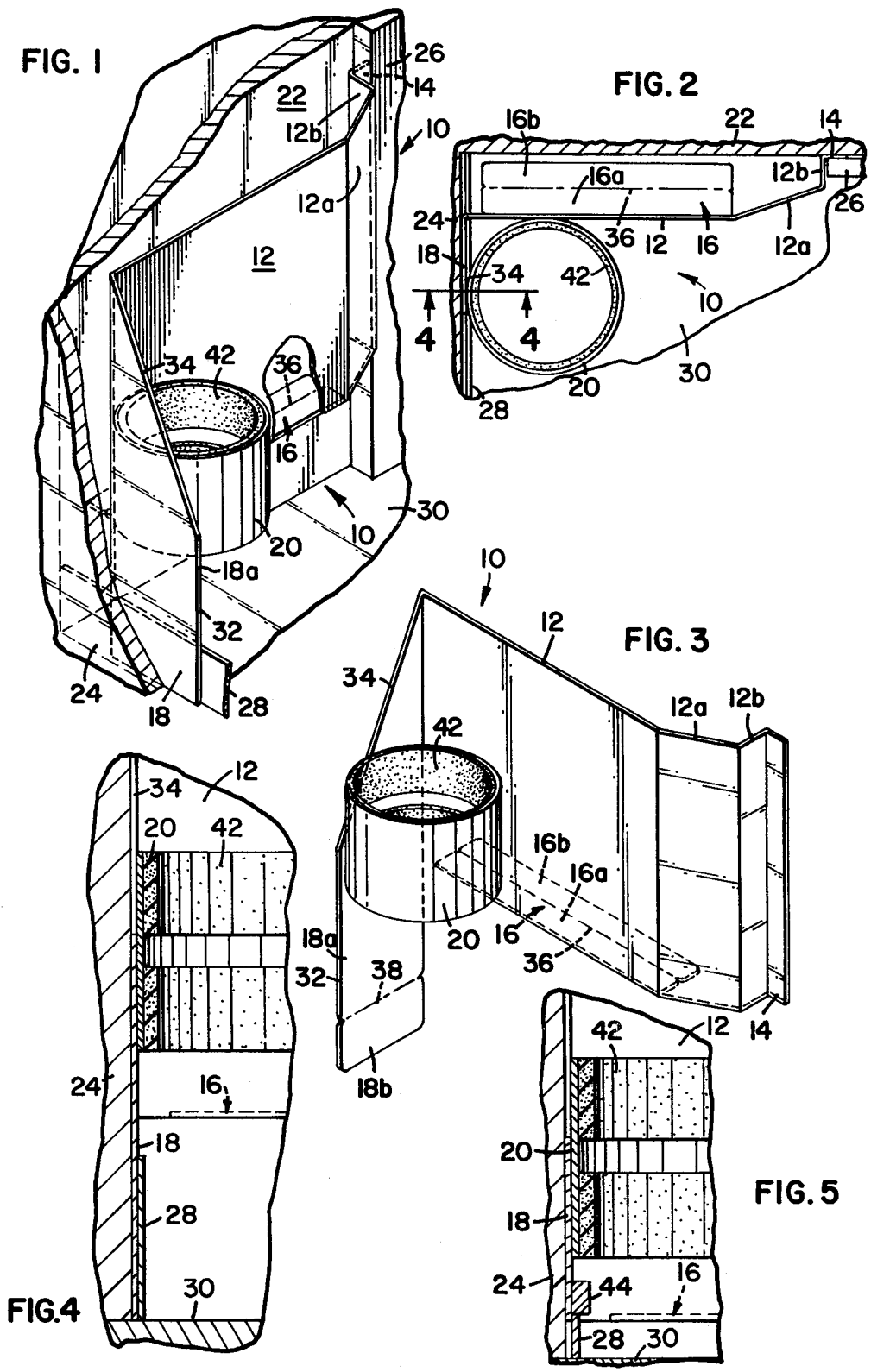

CONTAINER AND MANUAL HOLDER

BACKGROUND OF THE INVENTION

The present invention relates to a container and manual holder apparatus. In particular, the present invention relates to a document and cylindrical receptacle holder for mounting in a tractor cab.

When operating an agricultural vehicle such as a tractor, an operator's manual and other documentation are preferably kept readily accessible to the operator somewhere in the cab of the vehicle. In addition, food and beverages are often also carried on the tractor. Such items are often placed upon the floor or seat of the vehicle and are susceptible to being lost or the contents of the receptacle spilled. In addition, these items may distract the operator and thereby interfere with the operation of the vehicle.

Structures have been developed to retain such items. However, a holder apparatus is often not readily accessible to the operator. Furthermore, the holder apparatus are especially designed and constructed for each particular vehicle in which they are installed. In addition, installation of such holder apparatus often is rather difficult requiring many tools to be utilized. As a result, such holder apparatus are often expensive and do not provide ready access to such items as operator manuals or beverage containers.

The present invention overcomes these problems, and many others.

SUMMARY OF THE INVENTION

The present invention relates to a document and cylindrical receptacle holder apparatus for a vehicle. The holder apparatus includes a sheet of material bent to form at the front end of a side wall a front end support wall substantially parallel to but offset from said side wall. The side wall is further bent along a bottom portion to form a bottom wall perpendicular to the side wall. The front end support wall, the side and the bottom wall cooperate with a first wall of the vehicle to form an upwardly opening compartment. The side wall is offset from the wall of the vehicle. Furthermore, the side wall is bent at a back end to form a back end support wall. The back end wall is perpendicular to the side wall and extends generally away from the first wall of the vehicle. The back end support wall extends beyond the bottom of the side wall. The front end support wall cooperates with the first wall of the vehicle and the back end support wall cooperates with a second wall of the vehicle to retain the holder apparatus in position. The holder apparatus further includes a cylindrical member suitably attached to the back end support wall and the side wall. The cylindrical member is adapted for receipt of a cylindrical receptacle such as a thermos bottle.

In one embodiment of the present invention, the bottom wall is divided into an inner portion and an outer portion by a substantially weakened area along a line extending longitudinally of the side wall and being offset from the side wall. Consequently, the width of the bottom wall may be varied by separating the outer portion from the inner portion along the substantially weakened area thereby varying the width of the compartment provided and enabling the invention to fit varying configurations of vehicles.

In yet another embodiment of the present invention, the back end support wall is also divided into an upper and lower portion by a substantially weakened area along a line extending transversely of the back end support wall. Accordingly, the length of the back end support wall may be varied by separating the lower portion from the upper portion along the substantially weakened area.

In yet in another embodiment of the present invention, the front end support wall is adapted for insertion behind the tractor molding along the left-hand wall of the tractor cab while the back end support wall is adapted for insertion behind the floor molding along the tractor seat pedestal.

The present invention provides a holder apparatus which is adaptable to many types of tractor cabs. In particular, one embodiment of the present invention is adaptable to fit John Deere Tractor Models 2350, 2550, 2750, 2950, 4250, 4450, 4650, 4850, and the 30 and 40 Series in the John Deere tractor line.

The present invention provides a holder apparatus which provides a holder or receptacle for documents such as the operator's manual and cylindrical receptacles such as thermos bottles.

Furthermore, the present invention provides a holder apparatus which is as previously mentioned adaptable to many different models of tractors without requiring any modifications or special tools for installation. No screws, bolts, rivets, etc. are required to retain the holder apparatus in position. The front end support wall and the back end support wall cooperate with the walls of the tractor in the cab area to retain the holder apparatus in position.

In one embodiment of the present invention, the front end support wall is inserted between the left-hand side wall of the tractor cab and the molding adjacent the entrance into the cab while the back end support wall is inserted between the wall of the pedestal seat and a floor molding member. In this embodiment the back end support member rests on the floor of the cab to raise the holder apparatus off the floor a predetermined distance.

The present invention provides a holder apparatus which is thereby easy to install and relatively inexpensive to make. Furthermore, the present invention enables documents such as operator's manuals and beverage containers to be easily accessible to the operator. Furthermore, the present invention does not interfere with operator's activities.

These and other various advantages and features of novelty which characterize the invention are pointed out with particularity in the claims annexed hereto and forming a part hereof. However, for a better understanding of the invention, its advantages, and objects obtained by its use, reference should be had to the drawings to form a further part hereof, and to the accompany descriptive matter hereof, in which there is illustrated and described a preferred embodiment of the invention.

DESCRIPTION OF THE DRAWINGS

In the drawings, in which like reference numerals and letters indicate corresponding parts throughout the several views, FIG. 1, is a view in perspective of a preferred embodiment mounted along the left-hand wall and seat pedestal wall of the cab of a tractor;

FIG. 2, is a cross-sectional view of the preferred embodiment illustrated in FIG. 1;

FIG. 3, is a view in perspective of the preferred embodiment illustrated in FIG. 1;

FIG. 4, is a view along line 4—4 in FIG. 2;

FIG. 5, is a view similar to FIG. 4 of an alternate embodiment of the present invention.

DETAILED DESCRIPTION OF THE PREFERRED EMBODIMENT

Figure 6:
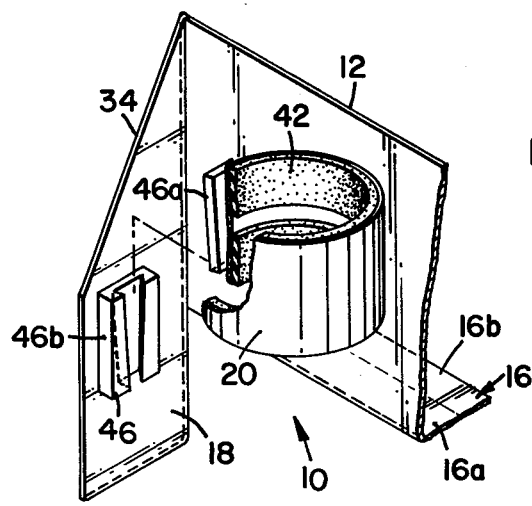
FIG. 6 is a view in perspective of yet another embodiment of the present invention.

Illustrated in FIGS. 1 through 4 is a preferred embodiment of the holder apparatus of the present invention generally designed by the reference numeral 10.

As illustrated, the present invention includes a single piece of sheet metal formed to provide a side wall 12, a front end wall 14, a bottom wall 16, and a back end wall 18. Suitably attached to the back end wall 18 and the side wall 12 is a cylindrical member 20.

More particularly, as illustrated in FIGS. 1 through 3, the front end wall is substantially parallel to the side wall 12 but is offset therefrom. In the preferred embodiment as illustrated, the side wall 12 is bent to form a portion 12a oblique with respect to the side wall 12 and a portion 12b perpendicular with respect to the side wall 12. The bottom wall 16 is perpendicular to the side wall 12. The back end wall 18 extends generally perpendicular to the side wall along the back end thereof.

The preferred embodiment of the present invention, is adapted for positioning in the cab of a tractor along a left hand wall 22 and a seat pedestal wall 24. More particularly, the front end wall 14 is adapted for insertion between the left-hand wall 22 and a molding 26 about the wheel of the tractor at the entrance of the cap. The back end wall 18 includes a portion which extends downward from the bottom of the side wall and is adapted for insertion between the seat pedestal wall 24 and a floor molding 28 therealong.

Accordingly, the present invention may be installed merely by inserting the front end wall 14 and the back end wall 18 into place. No additional tool or methods of attachment are required.

When installed, the back end wall 18 engages a floor 30 of the cab so as to maintain the holder apparatus 10 a predetermined distance above the floor. Typically, this distance is such that when a container is inserted into the cylindrical member 20, the cylindrical member 20 will cooperate with the floor 30 to retain the container in place.

Furthermore, as illustrated, the back end wall includes a lower outer edge 32 which is generally parallel to the side wall 12 and an upper outer edge 34 which is generally oblique with respect to the side wall 12. This configuration assists in providing easy access to the holder apparatus 10 by the operator.

Furthermore, the bottom wall 16 of the preferred embodiment includes a substantially weakened area 36 along a line extending generally parallel to the side wall and being offset therefrom so as to divide the bottom wall 16 into an inner and outer portion 16a, 16b. Preferably, this will be accomplished by scoring the metal such that by twisting the outer portion 16b, the outer portion 16b can be separated from the inner portion 16a. Furthermore, the back end wall 18 includes a similar substantially weakened area 38 extending along a line generally transverse with the respect to the back end wall 18. Accordingly, the back end wall 18 is divided into an upper portion and a lower portion 18a, 18b, respectively. As with the bottom wall, the lower back end wall portion 18b may be separated from the upper portion 18a by merely bending the back end wall portion 18b back and forth until the weakened area gives way (the lower portion 18b has been removed in FIG. 1). The substantially weakened areas 36, 38 enable the holder apparatus 10 of the present invention to be adaptable to many varying tractor models.

As illustrated in FIG. 2, the side wall 12 and the bottom wall 16 cooperate to form an upwardly opening compartment replacement of material such as an operator's manual. The bottom wall weakened area 36 enables the outer portion 16b of the bottom wall to be removed such that the compartment size can be varied. The distance that the back end wall 18 supports the holder apparatus above the floor of the cab 30 can be varied by removing the lower portion 18b.

Preferably the holder apparatus 10 of the present invention is made from a metal such as 18 gauge cold rolled steel although it will be appreciated that the present invention may be made from other materials such as injection molded plastics. The holder walls are formed preferably from a single piece of metal by the conventional use of forming and blanking dies. The cylindrical member 20 is also preferably made from cold rolled steel of about 20 gauge. The cylindrical member 20 may be attached to the end wall 18 and the side wall 12 by spot welding or the like.

As illustrated in FIGS. 1 through 4, the cylindrical member 20 includes on the inside surface thereof a shock absorbing material 42 to reduce vibration and lessen noise. Preferably, the material 42 is a foam rubber type of material having a self adhesive on one side thereof for securing the material to the inside surface of the cylindrical member 20. Although two strips of the material 42 are illustrated as being used, it will be appreciated that the entire inside surface might be covered.

In yet another embodiment of the present invention as illustrated in FIG. 5, the back end wall 18 includes a ridge 44 suitably attached thereto by such techniques as spot welds. Ridge 44 engages the floor molding 28 to retain the holder apparatus above the floor of the cab.

As will the wall members, the cylindrical member 20 may be made of injection molded plastic material or the like. In yet another embodiment of the present invention, the cylindrical member 20 and wall member are provided with a common hook and slot attachment mechanism during the formation process. Accordingly, the cylindrical member 20 at the time of installation is simply snapped into place.

In yet another embodiment as illustrated in FIG. 6, the back end wall 18 and the cylindrical member 20 includes a tongue and groove mounting apparatus 46 including parts 46a and 46b which cooperate to mount the cylindrical member 20 on the back end wall 18.

The present invention provides for a holder apparatus which is easily and quickly installed in the cab of tractors. The holder apparatus is self-fastening and requires no tools for installation. Furthermore, the holder apparatus provides easy accessability from both the operator's seat and ground. Furthermore, the present invention provides a holder apparatus for both documents such as an operator's manual and cylindrical container such as a thermos bottle.

In addition, the present invention is adaptable for many different models of tractors. In particular, the present invention is adaptable for use in John Deere tractor models 2350, 2550, 2750, 2950; 4250; 4450, 4650, 4850; and, the 30 and 40 Series of tractors. The preferred embodiment of the present invention is adapted for mounting on the left-hand wall and seat pedestal wall in the cab of these tractors. By removing the lower end wall portion 18b and leaving the bottom wall portions 16a,b in place, the present invention in particular is adaptable to John Deere tractor Models 2350, 2550, 2750 and 2950. By removing the bottom wall outer portion 16b and leaving the back end wall portions 18a, 18b in place, the present invention in particular is adaptable for mounting in John Deere tractor Models 4250, 4450, 4650, and 4850. When the bottom wall portion 16a,16b and the back end wall portions 18a,18b are both left in place, the present invention in particular is adaptable for John Deere 30 and 40 Series of tractors.

It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principle of the invention, to the full extent indicated by the broad general meaning of the term in which the appended claims are expressed.

What is claimed is:

1. A document and cylindrical receptacle holder apparatus for mounting in the cab of a tractor along the left-hand wall and seat pedestal wall near the floor of the tractor cab, said holder apparatus comprising:
   (a) a first sheet of material bent to form a front support wall substantially parallel to but offset from a side wall, a back support wall perpendicular to said side wall, and a bottom support wall, perpendicular to said side wall, said side wall having front and back ends and being offset from the left-hand wall of the tractor, said front wall being adjacent said front end of said side wall, said back wall being adjacent said back end of said side wall, said bottom wall being adjacent the bottom edge of said side wall, said side wall and said bottom wall cooperating with the left-hand wall of the tractor to form a compartment adapted for the receipt of a document such as an operator's manual, said back support wall including a portion extending beyond the bottom of said side wall, said front and back support walls cooperating to retain the holder apparatus in position, said front support wall being adapted for insertion behind the tractor molding along the left-hand wall and said back support wall being adapted for insertion behind the floor molding along the tractor seat pedestal; and
   (b) a hollow, open cylindrical member interconnected to said side and back walls above the bottom of said back wall, said cylindrical member being adapted for the receipt of a cylindrical receptacle, said cylindrical member cooperating with the floor of the cab to retain the cylindrical receptacle.

2. A holder apparatus in accordance with claim 1, wherein said bottom wall is divided into an inner portion and an outer portion by a substantially weakened area along a line extending longitudinally of said side wall and offset from said side wall, whereby the width of said bottom wall may be varied by separating said outer portion from said inner portion along said substantially weakened area thereby varying the width of the compartment provided.

3. A holder apparatus in accordance with claim 2, wherein said back support wall is divided into an upper and lower portion by a substantially weakened area along a line extending transversely of said back support wall, whereby the length of said back support wall may be varied by separating the lower portion from said upper portion along said substantially weakened area.

4. A holder apparatus in accordance with claim 3, wherein said holder apparatus is made from cold rolled steel.

5. A holder apparatus in accordance with claim 3, wherein said holder apparatus is made from a plastic material.

6. A holder apparatus in accordance with claim 3, wherein said holder apparatus is made by an injection molding process.

7. A holder apparatus in accordance with claim 3, wherein said cylindrical member includes a shock absorbing material suitably attached by an adhesive to the inner surface of said cylindrical member.

8. A holder apparatus in accordance with claim 4, wherein said cylindrical member is welded to said sheet of material.

9. A holder apparatus in accordance with claim 4, wherein said cylindrical member is attached to said sheet of material by a hook and slot attachment mechanism.

10. A holder apparatus in accordance with claim 7, wherein said shock absorbing material is a foam rubber material having a self-adhesive on one side.

11. A document and cylindrical receptacle holder apparatus for a vehicle, comprising:
    (a) a sheet of material bent to form at the front end of a side wall a front end support wall substantially parallel to but offset from said side wall, said side wall being further bent along a bottom portion to form a bottom wall perpendicular to said side wall, said side wall and said bottom wall cooperating with a first wall of the vehicle to form an upwardly opening compartment, said side wall being offset from the wall of the vehicle, said side wall being further bent at a back end to form a back end support wall, said back end support wall being perpendicular to said side wall and extending generally away from the first wall of said vehicle, said back end support wall extending beyond the bottom of said side wall, said front end support wall cooperating with the first wall of the vehicle and said back end support wall cooperating with a second wall of the vehicle to retain said holder apparatus in position, said front end support wall and said back end support wall being inserted between the first and second vehicle walls respectively, and adjacent partitions such as moldings; and
    (b) a cylindrical member attached to at least one of said back end support wall and said side wall, said cylindrical member adapted for receipt of a cylindrical receptacle, such as a thermos bottle.

12. A holder apparatus in accordance with claim 12, wherein said bottom wall includes a substantially weakened area along a line offset from and extending parallel of said side wall, whereby said bottom wall may be separated along said substantially weakened area thereby enabling the width of said bottom wall to be varied.

13. A holder apparatus in accordance with claim 12, wherein said back end support wall includes a substantially weakened area along a line extending transversely of said back end support wall, whereby said back end support wall may be separated along said substantially weakened area thereby enabling the length of said back end support wall to be varied.

14. A holder apparatus in accordance with claim 13, wherein said back end support wall engages a horizontal wall of the vehicle to retain the holder apparatus above the horizontal wall of the vehicle.

* * * * *

UNITED STATES PATENT AND TRADEMARK OFFICE
CERTIFICATE OF CORRECTION

PATENT NO. : 4,461,412

DATED : July 24, 1984

INVENTOR(S) : Robert Langland

It is certified that error appears in the above-identified patent and that said Letters Patent is hereby corrected as shown below:

Col. 2, Line 7, delete "in" (second occurrence).

Col. 2, line 56, delete "accompany" and insert --accompanying--.

Col. 3, line 33, delete "cap" and insert --cab--.

Col. 4, line 59, delete "accessability" and insert --accessibility--.

Col. 5, line 11, delete "portion" and insert --portions--.

Col. 6, line 51, after claim delete "12" and insert --11--.

Signed and Sealed this

Nineteenth Day of March 1985

[SEAL]

Attest:

DONALD J. QUIGG

*Attesting Officer*   *Acting Commissioner of Patents and Trademarks*